(12) United States Patent
Ahmad et al.

(10) Patent No.: US 10,047,626 B2
(45) Date of Patent: Aug. 14, 2018

(54) GAS TURBINE AND MOUNTING METHOD

(71) Applicant: Siemens Aktiengesellschaft, Munich (DE)

(72) Inventors: Fathi Ahmad, Kaarst (DE); Michael Händler, Erkrath (DE); Kevin Kampka, Mulheim a. d. Ruhr (DE); Christian Kowalski, Oberhausen (DE); Christian Kowalzik, Berlin (DE); Nihal Kurt, Dusseldorf (DE); Stefan Schmitt, Mülheim an der Ruhr (DE); Peter Schröder, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 226 days.

(21) Appl. No.: 14/910,035

(22) PCT Filed: Aug. 5, 2014

(86) PCT No.: PCT/EP2014/066845
§ 371 (c)(1),
(2) Date: Feb. 4, 2016

(87) PCT Pub. No.: WO2015/018841
PCT Pub. Date: Feb. 12, 2015

(65) Prior Publication Data
US 2016/0201496 A1      Jul. 14, 2016

(30) Foreign Application Priority Data

Aug. 9, 2013   (EP) ..................... 13179892

(51) Int. Cl.
*F01D 11/08*    (2006.01)
*F02C 3/04*     (2006.01)
(Continued)

(52) U.S. Cl.
CPC .............. *F01D 11/08* (2013.01); *F01D 5/143* (2013.01); *F01D 11/14* (2013.01); *F01D 25/28* (2013.01);
(Continued)

(58) Field of Classification Search
CPC .......... F01D 11/08; F01D 11/10; F01D 11/12; F01D 11/14; F01D 25/10; F01D 25/28; F01D 25/24; F01D 25/243; F02C 3/04
See application file for complete search history.

(56) References Cited

U.S. PATENT DOCUMENTS 2,685,429 A    8/1954 Auyer
3,656,862 A    4/1972 Rahaim et al.
(Continued)

FOREIGN PATENT DOCUMENTS

CN      1896465 A       1/2007
CN    101054909 A      10/2007
(Continued)

OTHER PUBLICATIONS

CN Office Action dated Mar. 2, 2017, for CN patent application No. 201480044111.0.
(Continued)

*Primary Examiner* — Woody Lee, Jr.
*Assistant Examiner* — Maxime Adjagbe
(74) *Attorney, Agent, or Firm* — Beusse Wolter Sanks & Maire

(57) ABSTRACT

A gas turbine includes an insert element for fastening to a ring segment body of a turbine of the gas turbine. The ring segment body has a recess on a hot gas side. The insert element is designed to cover the recess. The insert element includes a cover plate, which has a concavely shaped front side and a back side, and at least one foot arranged on the back side for positioning on the ring segment body. A (Continued)

mounting method includes mounting the insert element where the insert element is fixed to a recess of a ring segment body of a turbine of a gas turbine.

6 Claims, 3 Drawing Sheets

(51) Int. Cl.
*F01D 5/14* (2006.01)
*F01D 11/14* (2006.01)
*F01D 25/28* (2006.01)

(52) U.S. Cl.
CPC ............ *F02C 3/04* (2013.01); *F05D 2220/32* (2013.01); *F05D 2260/83* (2013.01); *Y02T 50/673* (2013.01)

(56) References Cited

U.S. PATENT DOCUMENTS

| | | | | |
|---|---|---|---|---|
| 4,087,199 | A * | 5/1978 | Hemsworth | ............ F01D 11/08 415/173.3 |
| 4,565,492 | A | 1/1986 | Bart et al. | |
| 4,728,257 | A | 3/1988 | Handschuh | |
| 7,556,475 | B2 * | 7/2009 | Roberts, III | ............ F01D 11/08 29/889.2 |
| 7,997,856 | B2 | 8/2011 | Khanin et al. | |
| 8,128,344 | B2 * | 3/2012 | McGovern | ............ F01D 11/08 415/116 |
| 2003/0185674 | A1 | 10/2003 | Alford et al. | |
| 2004/0047725 | A1 | 3/2004 | Tomita et al. | |
| 2004/0141838 | A1 | 7/2004 | Thompson | |
| 2007/0014670 | A1 | 1/2007 | Maeno | |
| 2007/0243062 | A1 | 10/2007 | Chevrette et al. | |
| 2008/0159850 | A1 | 7/2008 | Tholen et al. | |
| 2009/0035125 | A1 | 2/2009 | Fujimoto et al. | |
| 2011/0044805 | A1 | 2/2011 | Kioyabu et al. | |
| 2013/0170963 | A1 * | 7/2013 | Mironets | ................ F01D 11/12 415/173.1 |

FOREIGN PATENT DOCUMENTS

| | | |
|---|---|---|
| EP | 1965033 A2 | 9/2008 |
| EP | 1990507 A1 | 11/2008 |
| EP | 1965033 A2 | 9/2009 |
| JP | S47001154 A | 1/1972 |
| JP | S5910706 A | 1/1984 |
| JP | S6053603 A | 3/1985 |
| JP | 2003293704 A | 10/2003 |
| JP | 2004225698 A | 8/2004 |
| WO | 2008128876 A1 | 10/2008 |

OTHER PUBLICATIONS

JP Office Action dated Mar. 6, 2017, for JP patent application No. 2016-532669.
CN Office Action dated Jul. 4, 2016, for CN application No. 201480044111.0.

* cited by examiner

GAS TURBINE AND MOUNTING METHOD

CROSS REFERENCE TO RELATED APPLICATIONS

This application is the US National Stage of International Application No. PCT/EP2014/066845 filed Aug. 5, 2014, and claims the benefit thereof. The International Application claims the benefit of European Application No. EP13179892 filed Aug. 9, 2013. All of the applications are incorporated by reference herein in their entirety.

FIELD OF INVENTION

The present invention relates to a gas turbine and to a mounting method.

BACKGROUND OF INVENTION

It is known and widespread that rotor blade rows of turbines of gas turbines have, at the upper end of the blade airfoils, what is termed a shroud.

EP 1 965 033 A2 shows a rotor blade outer air seal segment of a turbine machine, which comprises a body with a base part. The base part has a transverse concave internal diameter surface, a front end, a rear end and first and second peripheral edges. The body comprises at least one mounting hook. At least one cover plate is attached to the body, so as to define at least one cavity. The cover plate comprises multiple feed-through holes. Multiple outlet holes extend through the base part to the internal diameter surface. At least the base part or the cover plate has a projection which protrudes into the cavity, so as to form a partial partition which separates a front cavity part from a rear cavity part.

An impingement cooling structure, for cooling hot walls of a turbine shroud and a turbine end wall, is known from EP 1 990 507 A1. The impingement cooling structure comprises multiple shroud elements arranged in a circumferential direction to form an annular shroud which encloses a hot gas stream, and a shroud cover which is mounted on radial outer surfaces of the shroud elements, so as to form a cavity therebetween. The shroud cover has a first impingement cooling hole which is connected to the cavity and which allows cooling air to be injected into the cavity such that an internal surface of the cavity is cooled by impingement. Each shroud element has a perforated fin. The perforated fin divides the cavity into multiple sub-cavities. Furthermore, the perforated fin comprises a second impingement cooling hole which allows the cooling air to flow through the first impingement cooling hole so as to be injected obliquely in the direction of a bottom surface of an adjoining sub-cavity.

US 2011/044805 A1 discloses a cooling system for a ring segment of a gas turbine. The cooling system comprises an impingement plate which has multiple small holes, a cooling space which is enclosed by the impingement plate and a main body of a segment body, a first cavity which is arranged in a downstream end position of the segment body in the flow direction of the combustion gas, such that it stands perpendicular to an axial direction of a rotation shaft, a first cooling duct which is connected to the cooling space and the first cavity, and a second cooling duct which is connected to the first cavity and a combustion chamber, which is arranged in a downstream end position of the segment body in the flow direction of the combustion gas.

WO 2008/128876 A1 relates to a stator heat shield for a gas turbine and to a gas turbine equipped with such a stator heat shield. The stator heat shield comprises an outer side which, in the installed state, is oriented toward a hot gas path of the gas turbine, an inner side which is oriented away from the outer side, multiple ribs which are formed on the inner side and which, in the installed state, extend axially with respect to a rotation axis of a rotor of the gas turbine and are spaced apart from one another in the circumferential direction, at least one impingement plate which is arranged on the inner side and which rests against the ribs, at least one groove which is formed in an end side bounding the stator heat shield in the circumferential direction and into which at least one sealing element can be fitted, and multiple bores which in each case at one end open onto the end side, spaced apart from the groove in the direction toward the outer side, and at the other end open onto the inner side, and which are spaced apart from one another in the axial direction.

US 2004/047725 A1 shows a ring segment of an annular form which is arranged around the outer circumference of rotor blades of a gas turbine. The ring segment comprises a blade ring, a main shaft and rotor blades with multiple individual units which define an annular form in that they are arranged around the circumferential direction of the main shaft and are arranged such that their inner peripheral surface is guided at a constant distance from the tips of the rotor blades. In that context, the individual units form depressions, which extend along the axial direction of the main shaft of the turbine, such that they are opposite one another. The ring segment also comprises a sealing plate, which is fitted in each opposing pair of the depressions such that the adjoining pairs of the individual units are connected to one another, and contact surfaces, which are formed at positions radially further inward than the sealing plates and extend in the axial direction and the circumferential direction and are in contact with one another.

Such shrouds make it necessary, during work on the rotor blade row which for example takes place for maintenance or testing purposes, to perform what is referred to as a cover lift, that is to say lifting the entire upper casing part in order to exchange ring segments which are arranged around the rotor blades. A cover lift is very onerous.

SUMMARY OF INVENTION

The present invention is based on an object of resolving these drawbacks and of providing an insert element, a ring segment, a gas turbine and a mounting method, such that it is also possible to operate a rotor blade row without a shroud in the gas turbine.

This object is achieved with a gas turbine as claimed and a mounting method as claimed. Advantageous refinements of the invention are specified in the subclaims and described in the description.

According to the invention, it is provided, in the case of a gas turbine having multiple rotor blade rows, that, in the case of that rotor blade row being the one situated downstream of the other rotor blade rows, there is provided around it a ring consisting of multiple ring segments, of which at least one comprises a ring segment body and an insert element, wherein the insert element to be attached to a ring segment body of a turbine of a gas turbine is designed to cover a recess and has a cover plate with a concave front side and a rear side and at least one foot, arranged on the rear side, for positioning on the ring segment body. The ring segment body has the recess on a hot gas side.

The ring segment body is designed for operation with a rotor blade row having a shroud.

In that context, it is further provided that, in the mounted state of the ring segment body in the turbine, the insert element can be introduced into the hot gas path and can then be fixed to the ring segment body.

This arrangement advantageously makes it possible to convert a gas turbine from operation with a rotor blade row having a shroud to operation with a rotor blade row without a shroud, without this requiring the use of new ring segments. This dispenses with the need for an onerous cover lift. It is also possible to save on onerous new manufacture of matching ring segments.

Thus, there is advantageously provided a gas turbine which is suitable for operation with a rotor blade row without a shroud. When replacing the rotor blades, it is not necessary to lift off the upper casing of the gas turbine (cover lift). Access from the outlet side is sufficient. The gas turbine according to the invention is thus particularly suitable for testing purposes, which involve more frequent changes to the blade airfoils. The present gas turbine allows these tests to be set up and carried out substantially more quickly.

In addition, the gas turbine according to the invention can easily be converted for operation with a rotor blade row having a shroud, by removing the at least one insert element from the ring segment body.

In one advantageous embodiment of the insert element according to the invention, the cover plate has, on an underside, at least one shaped portion to be pushed into an undercut of the ring segment body.

The shaped portion serves for quicker, easier and more precise positioning of the insert element prior to securing the insert element to the ring segment body. Installation can thus be carried out more simply and more easily.

In a further advantageous embodiment of the insert element according to the invention, the cover plate has at least one passage running from the front side to the rear side.

Thus, the insert element can be attached to the ring segment body simply using corresponding screws or bolts.

In a further advantageous embodiment of the insert element according to the invention, the insert element is of one-piece design.

This reduces the number of individual parts. This simplifies handling and saves on logistics costs.

In one alternative embodiment of the insert element according to the invention, the insert element is of multi-piece design and the cover plate can be connected to the at least one foot.

It is thus possible to first attach the at least one foot of the insert element to the ring segment body and then to attach the cover plate of the insert element to the at least one foot.

In a further advantageous embodiment of the insert element according to the invention, the cover plate has at least one receiving slot and the foot has a rail whose shape corresponds to the receiving slot.

Thus, the at least one foot and the cover plate can be securely connected to one another without the use of tools.

In a further advantageous embodiment of the insert element according to the invention, the insert element comprises multiple feet and the feet are connected to one another by a foot plate.

The feet are thereby permanently positioned with respect to one another. During mounting on the ring segment body, the feet can be arranged quickly. This simplifies the mounting of the insert element on the ring segment body.

In a further advantageous embodiment of the insert element according to the invention, the foot plate has at least one passage through the foot plate.

Thus, the feet are simple to attach to the ring segment body, by means of attachment means, in particular using bolts or screws.

The ring segment, according to the invention, of a turbine of a gas turbine comprises a ring segment body having a hot gas side which, in the mounted state, is oriented toward a hot gas path. The ring segment body has, on the hot gas side, a recess. In the recess there is arranged an insert element of the type described above.

The ring segment body is thus designed for operation of a rotor blade row without a shroud.

The insert element according to the invention is advantageously integrated into a gas turbine.

In the mounting method according to the invention, an insert element is fixed to a recess of a ring segment body of a turbine of a gas turbine. In that context, the recess is arranged on a hot gas side which, in the mounted state of the ring segment body, is oriented toward a hot gas path of the gas turbine. In particular, in the mounted state of the ring segment body, the insert element is introduced into the hot gas path and is then fixed to the ring segment body.

It is thus possible, in particular for test purposes, for a ring segment of a gas turbine to be readily converted from a configuration for operation with a rotor blade row having a shroud to a configuration for operation with a rotor blade row without a shroud. A reverse change is also easily possible.

BRIEF DESCRIPTION OF THE DRAWINGS

Exemplary embodiments of the invention will be discussed in more detail on the basis of the drawings and the following description. In the drawings.

DETAILED DESCRIPTION OF INVENTION

Figure 1:
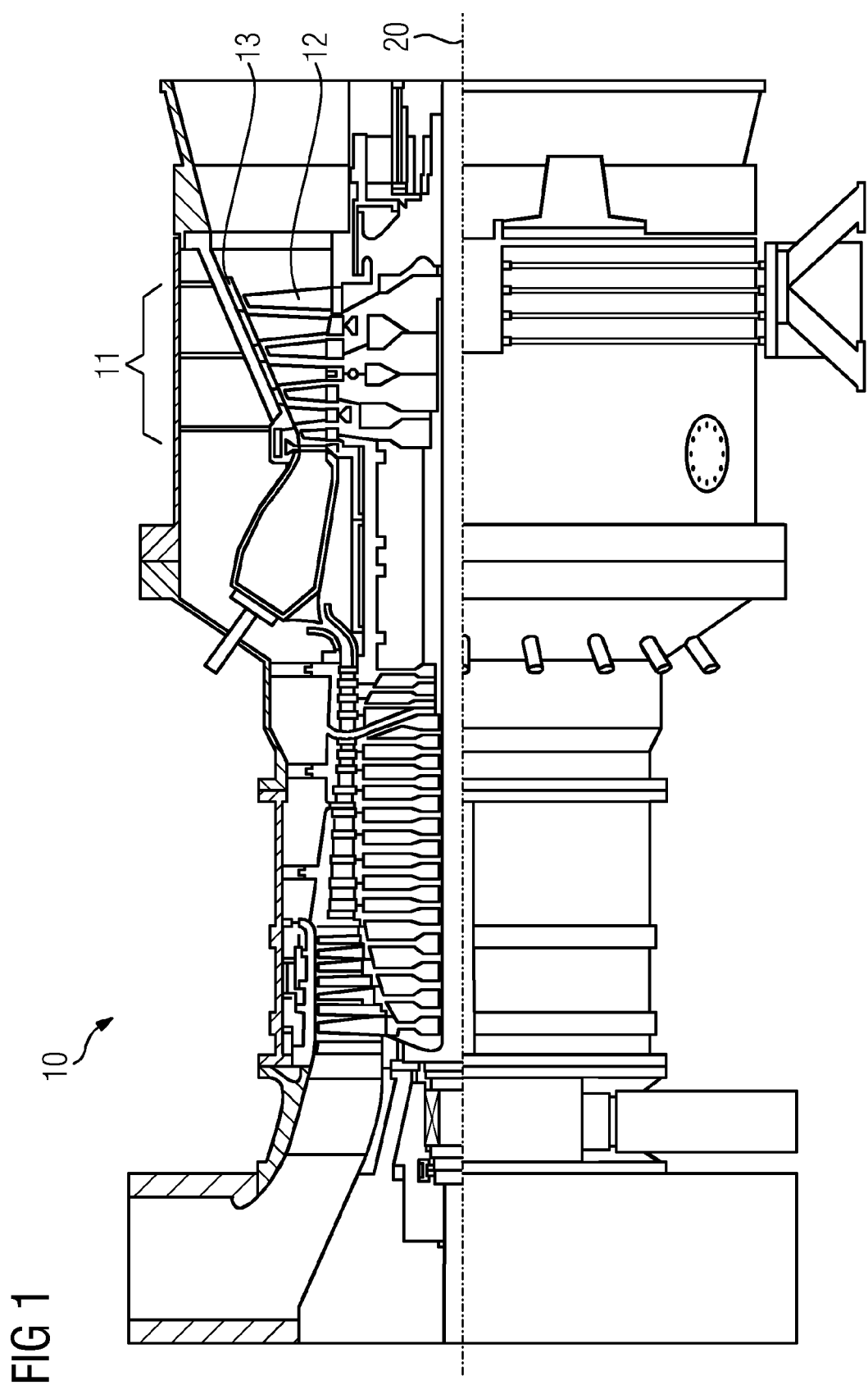
FIG. 1 shows a gas turbine according to the invention.

FIG. 1 shows a gas turbine 10 according to the invention, in an exemplary embodiment. The gas turbine 10 comprises a turbine 11 in which there is arranged at least one rotor blade row 12. Around this rotor blade row 12, there is arranged a ring consisting of multiple ring segments. The rotor blade row 12 is arranged so as to be able to rotate about an axis of rotation 20.

The rotor blade row 12 is in particular the one situated downstream of the other rotor blade rows. In FIG. 1, the corresponding rotor blade row 12 is the fourth rotor blade row of the turbine 11 of the gas turbine 10.

Figure 2:
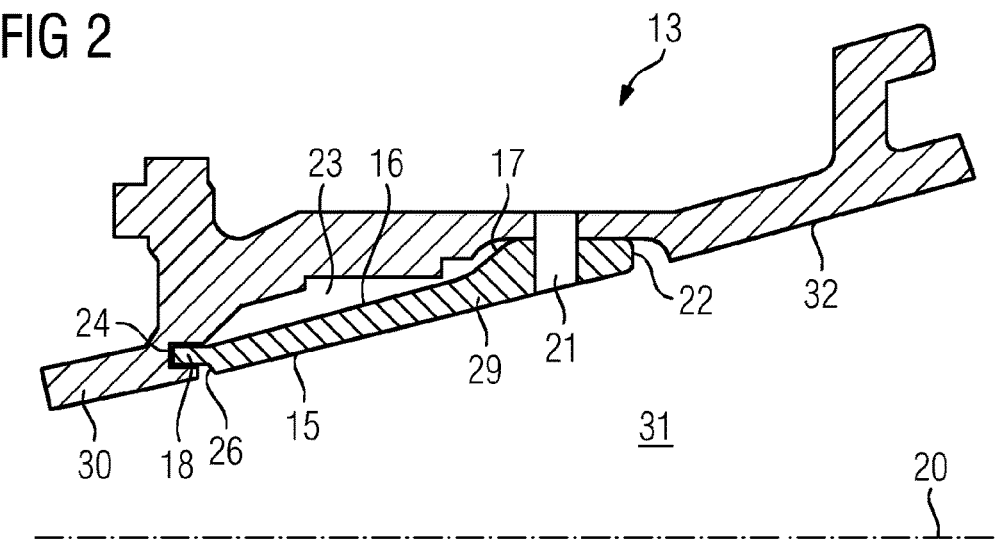
FIG. 2 shows a ring segment according to the invention.

The gas turbine 10 according to the invention has at least one ring segment 13 according to the invention. FIG. 2 shows a section view of the ring segment 13, in an exemplary embodiment.

The ring segment 13 comprises a ring segment body 30 and an insert element 14.

The ring segment body 30 comprises a hot gas side 32. In the mounted state, the hot gas side 32 is oriented toward a hot gas path 31 of the gas turbine 10.

The insert element 14 covers a recess 23 in the ring segment body 30. The recess is arranged on the hot gas side 32. The ring segment body 30 has this recess 23 for operation of the gas turbine 10 with a rotor blade row which has a shroud. In order for it not to be necessary to remove the entire upper casing half of the gas turbine (cover lift), for example during a testing phase, it is advantageous to use the rotor blade row 12 without a shroud. The insert element 14 according to the invention makes it possible for the ring segment body 30 to be adapted to the rotor blade row 12 which has no shroud.

The adaptation takes place by means of a mounting method according to the invention, in which the insert element 14 is fixed to the recess 23. In particular, this can take place while the ring segment body 30 is already mounted in the gas turbine 10. To that end, the insert element 14 is introduced into the hot gas path 31 and is then fixed to the ring segment body 30.

Figure 3:
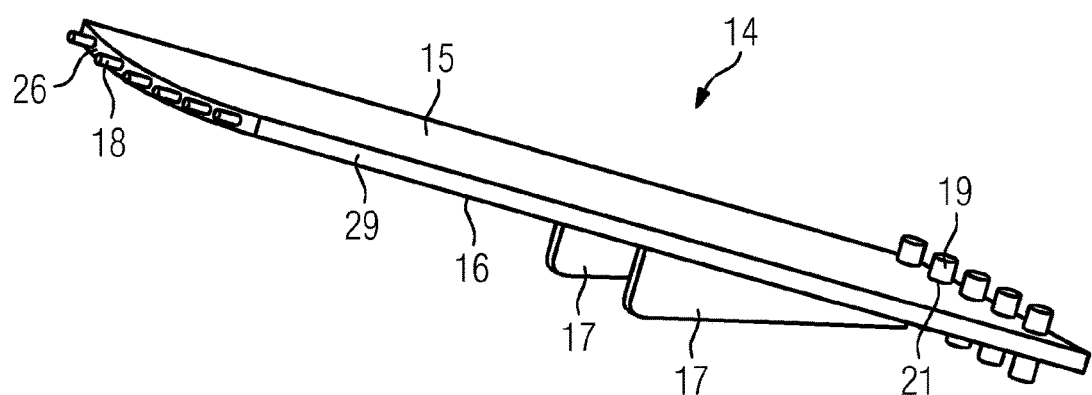
FIG. 3 shows an insert element according to the invention.

FIG. 3 shows the insert element 14 in an exemplary embodiment. The insert element 14 shown in an individual view comprises a cover plate 29 with a rear side 16 and with a concave front side 15. In the mounted state, the front side 15 is oriented toward the hot gas path 31. The insert element 14 has, on the rear side 16 of the cover plate 29, at least one foot 17 for positioning on the ring segment body 30.

In the embodiment shown, the insert element 14 comprises two feet 17. The insert element 14 shown also comprises, on an underside 26, multiple shaped portions 18. The shaped portions 18 on the underside 26 allow the insert element 14 to be pushed into an undercut 24 of the ring segment body 30. The at least one foot 17 positions the insert element 14 in its mounting position. The insert element 14 shown in FIG. 3 has five passages 21, running from the front side 15 to the rear side 16. The passages 21 serve for attaching the insert element 14 to the ring segment body 30. In that context, means for attaching the insert element 14 are fed through the passages 21. FIG. 3 shows five bolts 19, corresponding to the number of passages 21, as attachment means. The bolts 19 are in particular threaded bolts or screws. In the mounted state, the insert element 14 is securely connected to the ring segment body 30. In the mounted state, the insert element 14 is advantageously flush with the ring segment body 30. Mounting the insert element 14 on the ring segment body 30 creates a ring segment 13 according to the invention.

The front side 15 of the cover plate 29 of the insert element 14 according to the invention is concave and thus adapted to the ring segments 13 arranged around the rotor blade row 12. In the mounted state, the concave curvature of the front side 15 is perpendicular to the axis of rotation 20.

The insert element 14 can have, for each passage 21, a depression arranged coaxially with the passage 21. The attachment means for attaching the insert element 14, in particular the head of a screw, can be arranged in the depression so as not to stand proud of the contour of the insert element 14.

Figure 4:
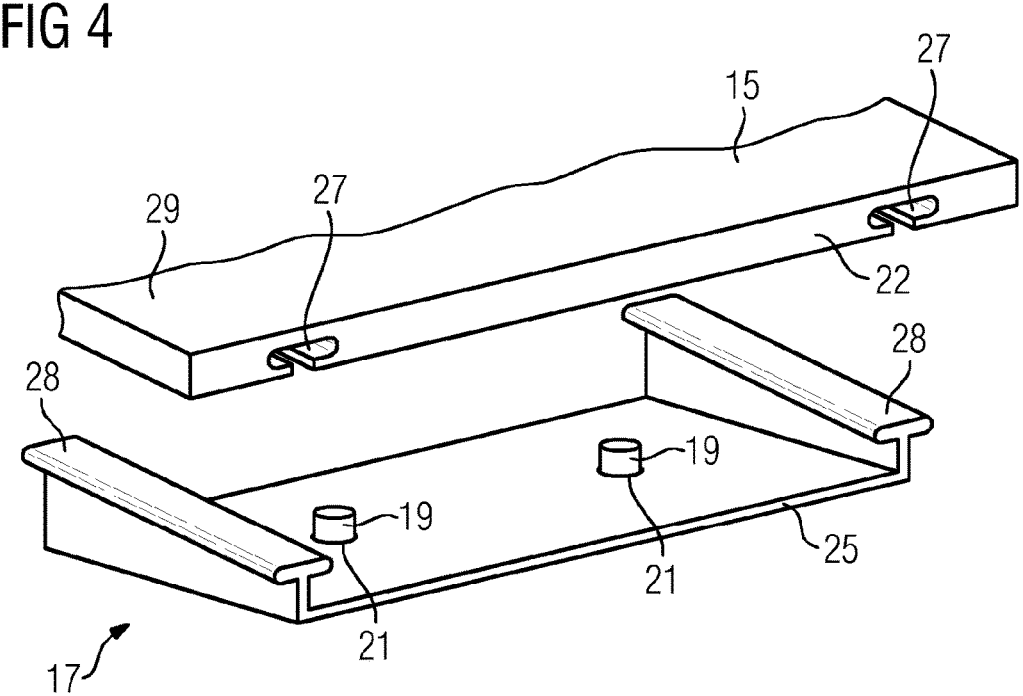
FIG. 4 shows a foot of the insert element according to the invention.

The insert element 14 according to the invention can be made in one piece. The at least one foot 17 is then integral with the cover plate 29. The insert element 14 according to the invention can alternatively also be made in multiple pieces. Then, the cover plate 29 can be connected to the at least one foot 17, in particular can be pushed onto the at least one foot 17. FIG. 4 shows such an embodiment of the insert element 14 according to the invention.

In the embodiment shown, the insert element 14 has two feet 17 which are connected to one another by means of a foot plate 25. In the embodiment shown, the foot plate 25 has two passages 21. Attachment means for attaching the foot plate 25 to the ring segment body 30 can be fed through these passages 21. FIG. 4 shows bolts 19 as attachment means. The multi-piece insert element 14 offers the possibility of first attaching the at least one foot 17 to the ring segment body 30 and then attaching the cover plate 29 to the foot 17. It is in particular possible for the cover plate 29 and the at least one foot 17 to be embodied such that the cover plate 29 can be pushed onto the at least one foot 17. In the embodiment shown in FIG. 4, the two feet 17 each have, to that end, a rail 28 and the cover plate 29 comprises two receiving slots 27. The receiving slots 27 are accessible from an upper side 22. The rails 28 and the receiving slots 27 have respectively corresponding shapes. Once the cover plate 29 has been pushed onto the at least one foot 17, the rail 28 is arranged in the receiving slot 27, thus securing the cover plate 29 on the at least one foot 17.

Although the invention has been described and illustrated in more detail by way of the preferred exemplary embodiment, the invention is not restricted by the disclosed examples and other variations can be derived herefrom by a person skilled in the art without departing from the scope of protection of the invention.

The invention claimed is:

1. A gas turbine comprising:
a turbine comprising a rotor blade row and a ring that is arranged around the rotor blade row and which comprises multiple ring segments,
wherein the rotor blade row is situated downstream of other rotor blade rows of the turbine,
wherein at least one ring segment of the multiple ring segments comprises a ring segment body comprising a hot gas side which, in a mounted state, is oriented toward a hot gas path,
wherein the ring segment body comprises, on the hot gas side, a recess in which is arranged an insert element,
wherein the insert element is configured to cover the recess and comprises: a cover plate comprising a concave front side and a rear side; and multiple feet connected to one another by a foot plate and arranged on the rear side for positioning on the ring segment body,
wherein, in the mounted state of the ring segment body in the turbine, the insert element is configured to be introduced into the hot gas path and fixed to the ring segment body, with the concave front side facing and defining a portion of the hot gas path, and
wherein the cover plate comprises at least one receiving slot comprising a T-shape, and wherein at least one foot of the multiple feet comprises a T-shaped rail which is configured to fit in the at least one receiving slot and thereby secure the multiple feet and the foot plate to the cover plate.

2. The gas turbine as claimed in claim 1,
wherein the cover plate comprises at least one passage running from the front side to the rear side.

3. The gas turbine as claimed in claim 1,
wherein the foot plate comprises at least one passage through the foot plate.

4. A mounting method, comprising:
fixing a base of an insert element to a recess of a ring segment body of a turbine of a gas turbine, wherein the insert element comprises a discrete cover plate and the base, the base comprising multiple feet and a foot plate connecting the multiple feet to each other, wherein the cover plate comprises a receiving slot configured to align with a hot gas path, and wherein at least one foot of the multiple feet comprises a rail comprising an end configured to fit within the receiving slot and interlock with the receiving slot and thereby secure the multiple feet to the cover plate,
wherein the recess is arranged on a hot gas side which, in a mounted state of the ring segment body, is oriented toward the hot gas path of the gas turbine, in the mounted state of the ring segment body, introducing the base into the hot gas path and fixing to the ring segment body, and installing the cover plate onto the base by aligning the rail with the receiving slot and then moving the cover plate in a direction from downstream to upstream relative to the hot gas path.

5. A gas turbine comprising:

a turbine comprising a ring arranged around a rotor blade row, wherein the ring comprises a ring segment comprising: a ring segment body; a recess in the ring segment body configured to face a hot gas path when installed and an insert element configured to be installed in the recess, wherein the insert element is configured to cover the recess and comprises: a cover plate; and a base comprising a foot plate and multiple feet connected to one another by the foot plate, wherein the cover plate is configured to bound a portion of the hot gas path, and wherein the base secures the cover plate to the ring segment body, wherein at least one foot of the multiple feet comprises a rail comprising an axial extent that is aligned with the hot gas path and a radial extent which extends radially toward the hot gas path, wherein a radially inward end of the radial extent comprises an interlocking geometry, and wherein the cover plate comprises a receiving slot configured to receive and hold the interlocking geometry within the cover plate, and wherein the cover plate is configured to receive the interlocking geometry by sliding the cover plate in a direction of the axial extent wherein the interlocking geometry comprises a crossbar of a T-shape.

6. The gas turbine as claimed in claim 5, wherein the base is configured to be installed in the recess from the hot gas path.

* * * * *